July 1, 1969  M. O. ENGEL  3,453,461
MAGNETOHYDRODYNAMIC ELECTRICITY GENERATING SYSTEMS
Filed Dec. 2, 1965
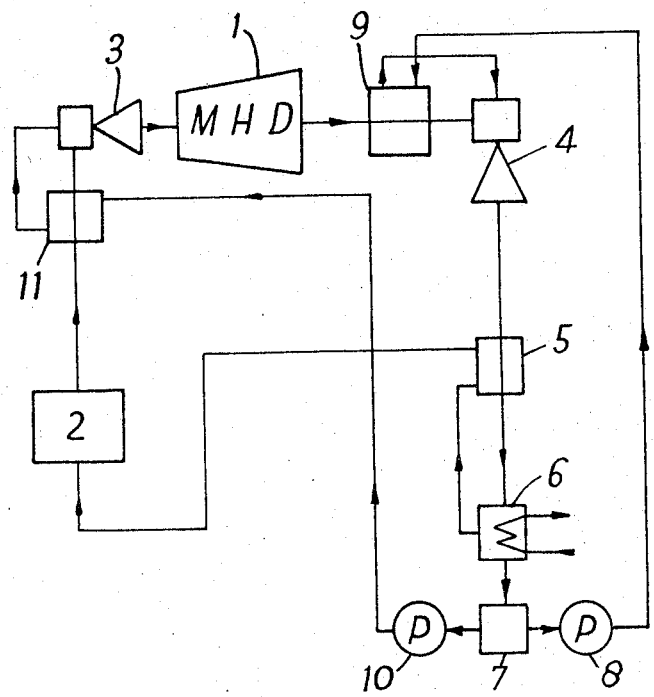
INVENTOR
Manfred Otto Engel
BY Kemon Palmer
Stewart & Estabrook
ATTORNEYS United States Patent Office 3,453,461
Patented July 1, 1969

3,453,461
MAGNETOHYDRODYNAMIC ELECTRICITY GENERATING SYSTEMS
Manfred Otto Engel, Fossway, Newcastle upon Tyne, England, assignor to International Research & Development Company Limited, Fossway, Newcastle upon Tyne, England
Filed Dec. 2, 1965, Ser. No. 511,200
Claims priority, application Great Britain, Dec. 18, 1964, 51,630/64
Int. Cl. H02k 45/00; G21d 7/02
U.S. Cl. 310—11                    10 Claims This invention relates to closed cycle magnetohydrodynamic or magnetoplasmadynamic electricity generating plant.

In magnetohydrodynamic or magnetoplasmadynamic (hereinafter abbreviated MHD) electricity generators, an electrically conducting gas is driven through a magnetic field transverse to the direction of gas flow. Ionisation of the gas to make it electrically conducting may be achieved by heating the gas to emperatures at which sufficient thermal ionisation occurs. By injecting a seeding material, for example, an alkali metal vapour such as caesium or potassium, into the gas the necessary degree of electrical conductivity can be achieved at lower temperatures than with thermal ionisation alone.

Basically, an MHD generator comprises a duct or nozzle through which the electrically conductive gas is driven and a magnetic field is set up by external means across the duct transverse to the direction of gas flow. Electrodes are placed on parts of the duct to collect current generated by the flow of the conducting gas through the magnetic field in accordance with well-known principles.

In a closed cycle MHD plant using a seeded gaseous working medium, the working medium leaving the MHD generator normally has the seeding material separated therefrom and the medium is then circulated to a heat source where it is reheated before having seeding material re-injected therein. The working medium containing the seeding material then re-enters the MHD generator. Some form of compressor or pump is required to raise the pressure of the working medium after it leaves the MHD generator and maintain its circulation through the heat source and generator. Mechanical gas compressors require lubrication and tend to be unsuitable for operation at the high operating temperatures of MHD plant.

The present invention employs jet-pumps or compressors. Such jet pumps or compressors work on the well-known ejector or injector principle and consist basically of a nozzle located in a duct. The momentum of a driving fluid injected through the nozzle entrains a secondary fluid flowing through the duct and accelerates it to a high velocity. A diffuser section may follow the nozzle so that pressure energy of the mixture can be recovered at the expense of the kinetic energy.

In accordance with the invention there is provided an MHD electricity generating plant including an MHD generator and a heat source through which a gaseous working medium is circulated in a closed cycle, the working medium having a seeding material injected into it to increase ionisation in the MHD generator including, for the purpose of circulating the working medium, at least one jet pump operated by the seeding material.

The use of the seeding material in vapour form as the driving fluid for the jet pump is advantageous since the densities of the driving and secondary fluid in such pumps should be similar. The amount of seeding material required for the MHD generator is not, however, sufficient to provide an adequate pressure rise in a jet pump to drive the working medium round the closed cycle.

To avoid having to pass excess seeding material through the MHD generator, the jet pump is preferably disposed after the MHD generator in the direction of flow fo the working medium and followed by a condenser to remove the excess seeding material before the working medium passes through the heat source and back to the MHD generator.

To prevent corrosion it is usually preferable to condense all the seeding material before the working medium passes through the heat source. It is then necessary to provide separate means for injecting the seeding material before the working medium enters the MHD generator. This injection means may be a second jet jump which also contributes to the circulation of the working medium.

The invention will now be described in more detail with the aid of an example illustrated in the accompanying drawing, which is a schematic diagram of a closed cycle MHD electricity generating plant in accordance with the invention.

An MHD generator 1 uses gaseous helium seeded with caesium as its working medium. The helium is heated in a heat source 2 which could, for example, be an advanced gas-cooled nuclear reactor. The helium is then compressed in a jet pump 3 which is driven by gaseous caesium at a flow rate providing the amount required for ionisation purposes. The gaseous working medium is then accelerated in a convergent nozzle in the generator 1 to the required high veloity for satisfactory generation of direct current at the terminals of the generator.

Exhaust gases from the generator 1 pass to the main circulating means for working medium comprising a jet pump 4. The pump 4 also uses gaseous caesium as its driving fluid. The working medium then flows via a recuperative heat exchanger 5 to a caesium condenser 6 which separates the liquid caesium from the helium. The helium passes to the heat exchanger 5, where it recovers some of the heat extracted from it for the purposes of seed removal, and then returns to the heat source 2 to recommence the cycle. Liquid caesium is drained from the condenser 6 to a seeding material hot well 7.

Gaseous caesium required as driving fluid in the jet compressors 3 and 4 is obtained by dividing the flow of liquid caesium at the hot well 7.

The principal proportion of caesium liquid from the hot well 7 is pumped by a pump 8, which may be an electro-magnetic pump, to an evaporator 9. The evaporator 9 is heated by the exhaust working medium from the MHD generator 1, and the vapourised caesium which it produces is led to the jet pump 4 where it entrains and drives the working medium. The pump 4 is the principal pump driving helium around the closed-cycle.

The quantity of caesium required for ionisation of the working medium is returned to the helium between the heat souurce 2 and the MHD generator 1. This is achieved by pumping the said quantity of caesium, in liquid form, from the hot well 7 by a pump 10, which again may be an electro-magnetic pump. The pump 10 drives the caesium to an evaporator 11, which is heated by the helium leaving the heat source 2. The vapourised caesium from the evaporator 11 is fed to the jet pump 3 where it further compresses helium from the heat source 2, the pump 3 thus serving to boost the compression produced by the pump 4.

The jet pumps 3 and 4 can be multi-stage jet pumps to obtain satisfactory pressure ratios. The jet jump 3 can be replaced by conventional injection means for introducing seeding material into the working medium. Compressors or pumps of other types may be used in conjunction with the jet pump or pumps to effect circulation of the working medium.

I claim:
1. A closed-cycle MHD generating plant comprising an MHD generator, having an inlet and an outlet, a heat source, conduit means interconnecting said generator and said heat source in a closed cycle, circulating means for circulating a gaseous working medium loaded with seeding material through said generator, said circulating means including a jet jump interposed in said conduit means and extraction means interposed in said conduit means to remove seeding material from the working medium, said extraction means being coupled to said jet pump to feed seeding material thereto.

2. Plant as claimed in claim 1 in which said extraction means comprises a condenser, the plant further including an evaporator coupling the condenser to said jet pump.

3. Plant as claimed in claim 2 wherein said jet jump is disposed between the outlet of the MHD generator and the condenser.

4. Plant as claimed in claim 3 wherein the condenser is disposed upstream of the heat source.

5. Plant as claimed in claim 4 including injection means disposed between the heat source and the inlet of the MHD generator to inject seeding material into the working medium.

6. Plant as claimed in claim 5 wherein said injection means comprise a second jet pump.

7. Plant as claimed in claim 5 wherein said condenser is coupled to the injection means to supply seeding material thereto.

8. Plant as claimed in claim 6 including a further evaporator coupling said condenser to said injection means.

9. Plant as claimed in claim 8 wherein said evaporators are heat exchangers heated by the working medium.

10. Plant as claimed in claim 1 wherein said jet pump is disposed between the MHD generator and the extraction means and the extraction means is a condenser disposed upstream of the heat source to condense all seeding material before the working medium passes through the heat source, said plant further including a first evaporator coupled to supply seeding material to said jet pump, an electromagnetic pump coupled between said condenser and said first evaporator, a second jet pump disposed at the inlet to said MHD generator to inject seeding material into the working medium, a second evaporator coupled to supply seeding material to the second jet pump, and a second electromagnetic pump coupled between said condenser and said second evaporator, said first and second evaporators being connected for heating by said working medium.

References Cited
UNITED STATES PATENTS 3,359,436    12/1967    Kohaut et al. _____ 310—11

J. D. MILLER, *Primary Examiner.*

DAVID X. SLINEY, *Assistant Examiner.*